Oct. 27, 1953 L. W. PARKER 2,657,331

ELECTRONIC COLOR TELEVISION

Filed June 5, 1948 2 Sheets-Sheet 1

INVENTOR.
LOUIS W. PARKER

BY [signature]

ATTORNEY

INVENTOR.
LOUIS W. PARKER
BY R. P. Morris
ATTORNEY

Patented Oct. 27, 1953

2,657,331

UNITED STATES PATENT OFFICE 2,657,331

ELECTRONIC COLOR TELEVISION

Louis W. Parker, Little Neck, N. Y., assignor to International Standard Electric Corporation, New York, N. Y., a corporation of Delaware Application June 5, 1948, Serial No. 31,326

8 Claims. (Cl. 315—26)

This invention relates to image receiving systems, and more particularly it relates to methods and apparatus for reproducing television images.

A principal object of the invention is to provide an improved arrangement for reproducing television images in color.

Another principal object is to provide a novel cathode ray tube for improving the reception of television images, either in conventional "black and white," or in color.

A further object is to provide an improved cathode ray tube and associated sweep control circuits whereby television images in color can be reproduced employing a single electron gun.

A feature of the invention relates to an improved arrangement for controlling the linearity of each scanning sweep of a cathode ray tube.

Another feature relates to a cathode ray tube having a novel conductive backing for the fluorescent screen, whereby sweep linearity control pulses can be set up under joint control of a frequency source local to the cathode ray tube and under control of the rate at which the cathode ray beam is moving transversely with respect to each scanned linear element of the screen.

Another feature relates to a comb-like electron transparent metal backing for the fluorescent screen of a cathode ray tube, whereby certain sweep control functions can be achieved without unduly increasing the manufacturing cost and complexity of the cathode ray tube structure.

A further feature relates to a screen for color television receiving tubes, comprising a fluorescent screen having associated therewith a plurality of sets of three-color filter elements and a comb-like electron transparent metal backing for controlling the proper registration of the scanning beam with the said elements.

The above-mentioned and other features and objects of this invention and the manner of attaining them will become more apparent and the invention itself will be best understood, by reference to the following description of any embodiment of the invention taken in conjunction with the accompanying drawings, wherein.

Figures 1, 2:
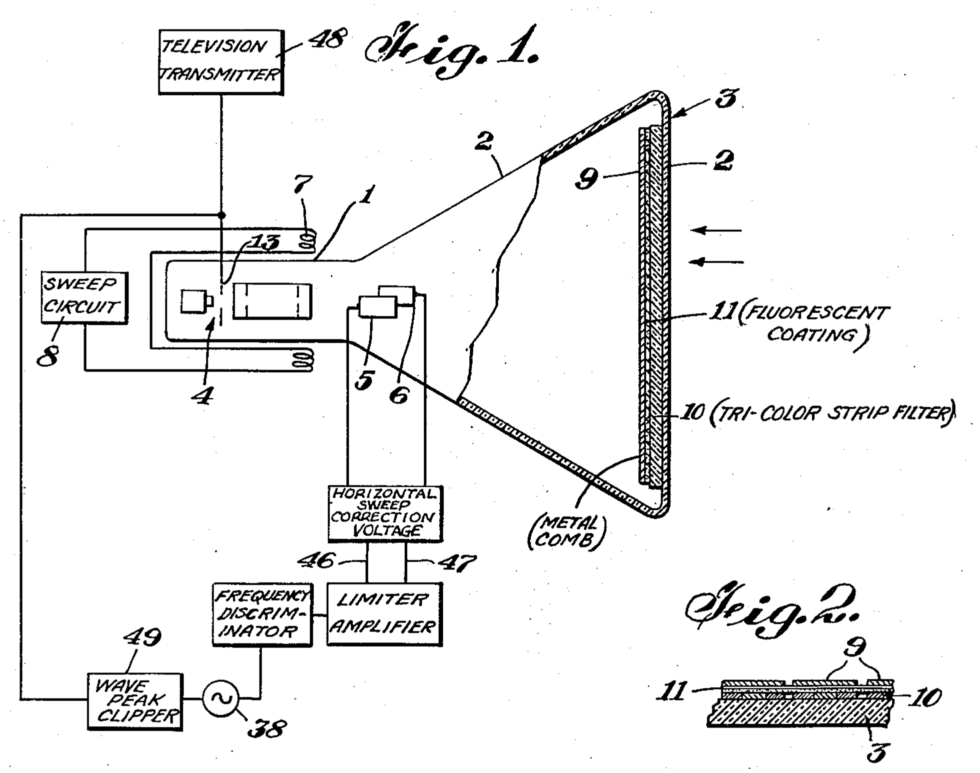
Fig. 1 is a view, partly sectional, of a cathode ray tube embodying features of the invention.
Fig. 2 is a sectional view of the viewing end of the tube of Fig. 1, and taken along the line 2—2 thereof.

While the present invention finds its primary utility in connection with television image reproducing tubes of the three-color type, it is also capable of advantageous use in controlling the sweep linearity of ordinary black and white trace cathode ray tubes. Referring to Fig. 1, there is shown a typical form of cathode ray tube comprising the neck portion 1, joined to the flared body portion 2 which is closed-off by the substantially flat viewing portion 3. Mounted in the neck of the tube is any well-known construction of electron gun 4 for developing a beam of electrons which is focussed in the usual minute scanning spot on the viewing screen at the end 3 of the tube. Associated with the gun 4 are the horizontal beam deflector plates 5, 6. The horizontal deflection is accomplished by coils 7 coupled to sweep circuit 8, the plates 5 and 6 being used only for correction of inaccuracies of the sweep. The vertical deflection coils are omitted for sake of clarity since they are conventional and form no part of the invention. Attached in any convenient way to the end 3 interiorly of the tube, is a composite screen consisting of three planar members or layers 9, 10, 11. The layer 9 is composed of a comb-like electron transparent metal coating or backing, to be described in detail in connection with Fig. 3. The layer 10 comprises a color filter or screen constituted of a series of adjacent sets of color filter strips, each set comprising, for example, adjacent blue, green and red filter elements, as described in detail in my co-pending application Serial Number 6641/48, filed February 6, 1948. The layer 11 is the usual fluorescent coating, preferably, although not necessarily, of the kind which produces substantially white light when bombarded by the cathode ray beam. The particular filter strip in each set that is being scanned at any given instant of time, is determined by a suitable color registering control signal which may be transmitted and received in any well-known manner. The scanning spot 12 (Fig. 3) is preferably rectangular in shape, having a width equal to the width of a color filter strip. As the spot sweeps across the filters, it will be registered with either the blue, red or green strip, as determined by the said color registering signal. In other words, the spot during each horizontal trace can be given a subsidiary horizontal deflection within the limits *a*, *b* (Fig. 3), representing the width of a three-color strip. At the completion of each horizontal trace, the spot 12 is deflected vertically in the usual manner.

Figure 3:
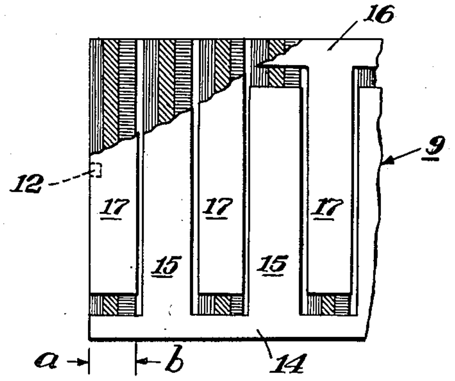
Fig. 3 is a detailed end view of the screen used in the tube of Fig. 1.

When the spot 12 strikes the fluorescent screen 11, it develops a light intensity in accordance with the received intensity signal potential which is impressed upon the control grid 13. The color of the resultant light when viewed in the direction of the arrows (Fig. 1) will therefore be dependent upon the particular color filter strip with which the spot is in registry at any given instant. The observer therefore sees the image reproduced in the proper color values, it being understood that the screen as a whole is scanned at a sufficiently high rate as to give in effect the visual impression of a single composite colored image reproduction. However, as is well known in the television art, the image is reproduced in a series of successive discrete dots each of which is determined by the color synthesis which is effected by the spot 12 as it registers with the appropriate colored filter strip of each successive set. One of the difficulties with a three-color filter strip arrangement, is the necessity of making sure that at any given instant during each horizontal scan the luminescent scanning spot is in accurate registry with each filter of the screen. In other words, perfect linearity of the horizontal sweep must be effected. In accordance with this invention, this result is obtained by employing a linearity trace control circuit, which, itself, is under control of the comb-like metal backing element 9. While transparent metal backings for fluorescent screens have been proposed heretofore, they have been used mainly for improving the optical translational efficiency of the screen. In any event, these prior backings have been uniformly distributed over the beam side of the fluorescent coating 11 facing the electron gun 4. According to the present invention and as shown in Figs. 2 and 3, the backing 9 is formed in separate strips with alternate strips interconnected to respective common return strips or conductors. The backing material may consist, for example, of aluminum of sufficient thinness to be transparent to the electrons in the cathode ray beam, while acting as a polished reflector for the light generated by the fluorescent material 11. Preferably, these strips and their respective return conductors are applied by evaporation in vacuo on the fluorescent coating 11, so as to form a pair of interleaved combs. Thus, as shown in Fig. 3, one comb comprises the yoke 14 with its vertically extending strips 15; the other comb comprises the yoke 16 with its downwardly extending strips 17. Preferably, the interleaved strips are spaced as closely as possible, but without contacting each other. Each strip is approximately of the same width *a*, *b*, as the combined width of each set of adjacent filter strips with which it is in registry. It will be observed that the ends of the several strips 15, 17, terminate short of the opposite yoke 16, 14, so that the two combs are electrically insulated from each other.

Figures 4, 5, 6:
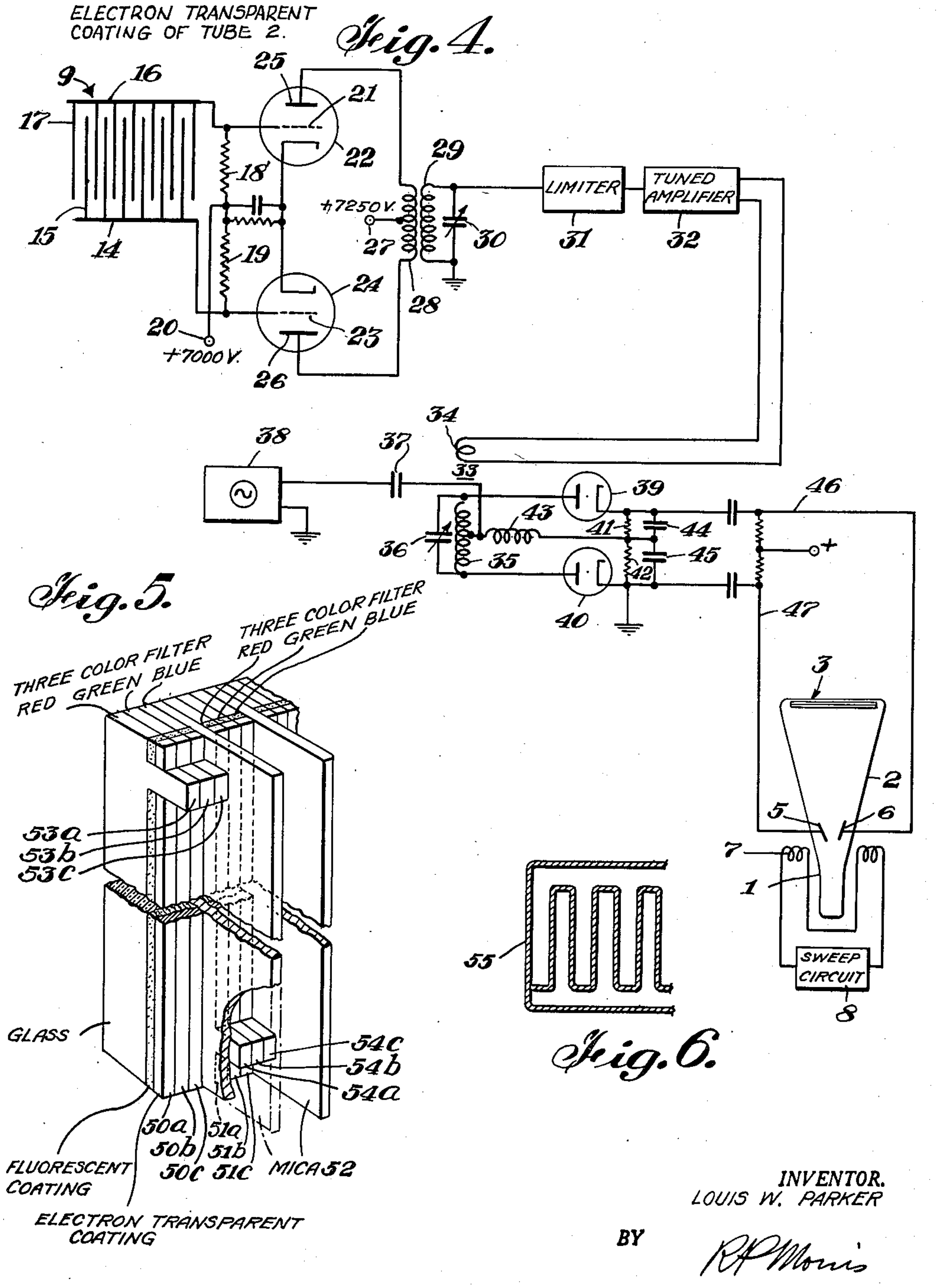
Fig. 4 is a schematic wiring diagram of a sweep linearity or registering circuit according to the invention.
Figs. 5 and 6 show alternative arrangements for forming the conductive comb according to the invention.

The two conductive combs are schematically shown in Fig. 4, and each is arranged to be connected through respective resistors 18, 19, to the high voltage D. C. terminal 20, for example 7,000 volts, which is also connected in the usual way to the second or accelerating anode of the electron gun. Consequently, as the scanning spot leaves, for example, the edge of each strip 17, it sets up an electrical pulse, and likewise as it reaches the next strip 15 it sets up a similar pulse. The first pulse is therefore applied over resistor 18 to the control grid 21 of an electron tube amplifier 22. The next pulse resulting from the transition of the beam from strip 17 to the next adjacent strip 15, is applied over resistor 19 to the control grid 23 of an amplifier tube 24 similar to tube 22. The plates 25 and 26 of the amplifier tubes are connected in push-pull relation to the high voltage D. C. terminal 27, through the primary winding 28 of a push-pull output transformer, whose secondary winding 29 is tuned by the condenser 30.

It will be clear, therefore, that when the spot 12 continuously scans the alternate tri-color sets at the proper rate, a predetermined frequency is set up in the aforementioned pulses applied to grids 21 and 23. The circuit 28, 29, 30, is therefore tuned to this predetermined frequency. As long as this frequency remains constant at this predetermined value, it is an assurance that the color filter strips are being properly and linearly scanned. If, however, the scanning sweep departs from such linearity, it changes the cadence or frequency of the said pulses. In accordance with one feature of this invention, this change in frequency is applied to set up a control voltage for automatically restoring the linearity of the scanning sweep. For this purpose, the pulses from amplifiers 22 and 24 are applied to any well-known limiter 31 for bringing all the pulses to the same amplitude. These uniform amplitude pulses are then applied to any well-known tuned amplifier 32 to convert them into substantially sinusoidal waves of the same frequency. These waves are then applied to any well-known frequency-to-amplitude discriminator network comprising, for example, the discriminator transformer 33 whose primary winding 34 is excited by the output of amplifier 32. The secondary winding 35 of this discriminator transformer is tuned by the condenser 36 to the said predetermined frequency which will represent the center frequency of the discriminator. Coupled through a suitable condenser 37 to the electrical midpoint of the winding 35 is a local source of oscillations 38 which may be of any accurately controllable type normally generating a frequency equal to the said predetermined frequency.

Transformer winding 35 is connected to the diodes 39, 40, whose respective load resistors 41, 42, are returned to the midpoint of winding 33 through a suitable impedance 43. Each of the resistors 41, 42, is shunted in the usual way by the condensers 44, 45. When the waves from amplifier 32 and those from source 38 are in 90° phase relation to each other, there is no D. C. output from the diodes 39, 40. If, however, the frequency from amplifier 32 should drift, as a result of a non-linear scan by spot 12, either a positive or a negative D. C. potential will appear across conductors 46, 47, depending upon the direction of the drift. For example, if the scanning spot 12 (Fig. 3) should, during its left to right scan across strips 17, 15, depart from its linear sweep to traverse the beam at a speed higher than normal, there will be a change in frequency or phase of the waves from the amplifier 32, in one sense. On the other hand, if this sweep should vary to reduce the speed of traverse of the beam, there will be a change, in the opposite sense, of the frequency or phase of the waves from amplifier 32. Since the rectified voltage across conductors 46, 47, is such as to oppose the above-mentioned change in phase which tends to result from the non-linear scan by spot 12. Thus, the spot 12 is at all times automatically constrained to execute a linear trace extending across the tri-color strips; and the waves from sources 32 and 38 are kept at 90° phase relation during the trace. In order that the system may fully operate, even on completely black portions of the original picture, suitable adjustments may be made at the receiver so that when a totally black area is being scanned, there is produced a minimum current signal which can be amplified to a sufficient amount to control the tubes 22 and 24 as above described.

While the local oscillator 38 may be locally controlled in frequency, preferably it is locked in frequency by means of a scanning frequency transmitted from the television transmitter 48 (Fig. 1). Thus, during each horizontal blanking time of the transmitting scanner, a particular frequency signal can be transmitted to the receiver which frequency corresponds to the normal frequency of oscillator 38 or to a harmonic thereof. This received controlling frequency can be subjected to peak clipping in any well-known peak clipping device 49, and then applied to the oscillator 38 to pull it into synchronism with the received controlling frequency. The stability of the oscillator 38 is such that it is able to remain, during one horizontal line scanning (about 57 micro-seconds), within less than 60° of its proper frequency. Any well-known oscillator having a stability of 0.05% fulfills these requirements, and a drift in frequency of 60° or less does not disturb the operation of the system.

While in the foregoing description the strips 15 and 17 have been referred to as being of a particular width *a—b*, and with one conductive backing strip for each tri-color filter set, it will be understood that the strips 15 and 17 may be made of any desired width so long as the spacing between adjacent strips is sufficiently narrow as to be unnoticeable in the reproduced television image. For example, the strips 15 and 17 may be as much as one-quarter inch wide with a spacing of 0.005 inch between strips. Preferably, however, in the case of a tri-color filter screen such as that described, each of the color filter strips may have a width of 0.005 inch, in which event the strips 15 and 17 should have a width of approximately 0.015 inch and the spacing between adjacent strips 15 and 17 may be 0.001 inch. It will be understood, of course, that the above-mentioned dimensions are merely given as illustrative, and the invention is capable of use with any desired ratio of dimensions.

While any well-known method may be employed for depositing the conductive comb-like member on the fluorescent coated light filter strips, there are shown in Figs. 5 and 6 two representative methods. Thus, as shown in Fig. 5, each of the light filter strips may be in the form of a glass slab, for example slab 50*a* being of red glass, slab 50*b* being of green glass, and slab 50*c* being of blue glass, each of these slabs having a thickness of 0.005 inch. The strips 50*a*, 50*b*, 50*c*, are assembled in sets of three, face to face in stacked relation, the edges forming the separate color filter strips. However, interposed between the strip 50*c* and the red strip 51*a* of the next set, is a mica plate 52. Plate 52 is of 0.001 inch thickness and projects perpendicularly outward from the filter strip plane an appreciable distance, for example one-sixteenth of an inch. All the filter strips may have their surfaces previously coated with the fluorescent material, or if desired, this fluorescent material may be applied to the filter strips after they have been assembled, as above described. When the filter strips and the mica spacers 0.001 have been assembled with the fluorescent coating thereon, the aluminum is deposited or evaporated thereon in any suitable manner. However, it should be observed that the upper ends of the strips 50*a*, 50*b*, 50*c*, have aligned raised ribs 53*a*, 53*b*, 53*c*, while the lower ends of the strips 51*a*, 51*b*, 51*c*, have similar aligned raised ribs 54*a*, 54*b*, 54*c*. Consequently when the aluminum has been deposited as above described, the next step is to coat all the filter strips with a suitable material such as paraffin, except that the raised ribs 53*a*, 53*b*, 53*c*, 54*a*, 54*b*, 54*c*, etc. are not coated with the paraffin and neither is the front edge of the mica spacers 52. By means of a suitable chemical such as an alkali, the previously deposited aluminum on the raised ribs 53*a*, 53*b*, 53*c*, 54*a*, 54*b*, 54*c*, etc. and on the edge of mica spacer 52 is removed. Thereafter the paraffin which was previously deposited on the remainder of the surface of the filter strips can be dissolved with a suitable liquid solvent, whereupon the screen is ready for assembly within the cathode ray tube. It will be understood, of course, that the various strips have their faces cemented together by a suitable cement such as sodium silicate, to form a complete unit.

Fig. 6 shows an alternative method of forming the comb-like metal backing by using a previously formed wire grid or mask 55 which can be placed over the assembled light filter strips at the time the aluminum is to be deposited thereon. This mask, as shown in Fig. 6, is so shaped that it protects the surface of the filter strip screen from deposition of the aluminum at the desired areas. The mask can then be removed, and the screen is then ready for assembly within the tube.

While the invention has been described in connection with a color television receiver, it will be understood that the linear trace control arrangement shown in Figs. 1 and 4 is equally well adaptable to ordinary black and white television transmissions, for maintaining the desired linearity of a scanning trace along the linear elements of a fluorescent screen. Furthermore, the invention is also useful where the tri-color screen is formed of strips of red, green, and blue fluorescent materials which generate the respective primary colors directly upon bombardment by the cathode ray beam.

What is claimed is:

1. An arrangement for controlling the linear sweep of a cathode-ray beam, comprising means to develop a scanning cathode-ray beam, a viewing screen, means to move said beam to scan said screen across successive linear filter elements, said screen having a fluorescent coating and a conductive coating of material pervious to the cathode-ray beam, said conductive coating having at least two sections extending transversely of the linear scanning movement of said beam and having a space therebetween extending parallel to said linear elements, a source of potential connected to said two sections, means responsive to said potential and the scanning movement of said beam to produce a signal of a predetermined frequency when the beam is scanning said elemental strips at a predetermined speed but of a different frequency when the beam departs from said predetermined speed, and electrical circuits controlled by said signal to constrain said beam to scan said linear elements at said predetermined speed.

2. An arrangement according to claim 1 in which said electrical circuits include a device for generating a comparison signal of a predetermined frequency, and means to compare the frequency of the first-mentioned signal with the frequency of the said comparison signal to derive a sweep correcting voltage, and means for applying said correcting voltage to said beam moving means.

3. An arrangement according to claim 1 in which said screen comprises a series of light transmitting slabs coated with said fluorescent material, and said conductive coating comprises a series of strips slightly spaced apart and extending parallel to the length of said slabs.

4. An arrangement according to claim 1 in which said screen comprises a series of light transmitting slabs coated with said fluorescent material, said slabs being arranged in adjacent sets of three per set for transmitting respective primary colored lights when scanned by said beam, and said conductive coating comprises a series of strips each strip registering with a corresponding one of said sets of three slabs.

5. An arrangement according to claim 1 in which said signal comprises a series of pulses of a given frequency when said beam scans said elemental strips at said predetermined speed and of a different frequency when said beam departs from said predetermined speed, and said circuits include a local source for generating a comparison frequency independent of said scanning, a frequency discriminator for comparing said signal with said local frequency to produce a sweep correction voltage, and circuit connections for applying said sweep correction voltage to the beam moving means to constrain the beam to scan at said predetermined speed.

6. An arrangement according to claim 1 in which said signal comprises a series of pulses of a given frequency when said beam is scanning at said predetermined speed and a different frequency when said beam departs from said predetermined speed, a local source for generating a comparison frequency independent of said scanning, a limiter and tuned amplifier for converting said pulses into substantially sinusoidal waves of uniform amplitude, a phase comparison circuit excited by said sinusoidal waves and by said comparison frequency to produce a sweep correction voltage only when said sinusoidal oscillations and said local frequency depart from a predetermined phase relation, and circuit connections for applying said sweep correction voltage to said beam moving means to constrain the beam to scan at said predetermined speed.

7. An arrangement for controlling the linear sweep of a cathode-ray beam, comprising means to develop a scanning cathode-ray beam, a viewing screen, means to move said beam to scan said screen in linear picture elements, means responsive to the scanning of said screen to produce a signal of a given frequency when the beam scans the elements at a constant speed and of a different frequency when the beam departs from said constant speed, means independent of said scanning to develop a comparison frequency, circuit connections for comparing the frequency of said signal with said comparison frequency to derive a sweep control voltage, and circuit connections for applying said sweep control voltage to the beam moving means to constrain the beam to follow a predetermined scanning pattern with relation to linear elements of the screen.

8. An arrangement according to claim 7 in which means are provided for controlling said comparison frequency in accordance with a pilot frequency received from a television transmitting scanner.

LOUIS W. PARKER.

References Cited in the file of this patent

UNITED STATES PATENTS

| Number | Name | Date |
|---|---|---|
| 2,310,863 | Leverenz | Feb. 6, 1943 |
| 2,312,792 | Bamford | Mar. 2, 1943 |
| 2,416,056 | Kallmann | Feb. 18, 1947 |
| 2,446,249 | Schroeder | Aug. 3, 1948 |
| 2,446,440 | Swedlund | Aug. 3, 1948 |
| 2,446,791 | Schroeder | Aug. 10, 1948 |
| 2,457,911 | Munster | Jan. 4, 1949 |
| 2,458,291 | Munster | Jan. 4, 1949 |
| 2,461,515 | Bronwell | Feb. 15, 1949 |
| 2,477,008 | Rosen | July 26, 1949 |